(12) United States Patent
Ba-abbad et al.

(10) Patent No.: US 8,877,016 B2
(45) Date of Patent: Nov. 4, 2014

(54) SOLAR STEAM GENERATION

(75) Inventors: Mazen A. Ba-abbad, Riyadh (SA);
Hany A. Al-Ansary, Riyadh (SA);
Essam A. Al-Ammar, Riyadh (SA)

(73) Assignee: King Saud University, Riyadh (SA)

( * ) Notice: Subject to any disclaimer, the term of this patent is extended or adjusted under 35 U.S.C. 154(b) by 432 days.

(21) Appl. No.: 13/290,120

(22) Filed: Nov. 6, 2011

(65) Prior Publication Data
US 2013/0112189 A1 May 9, 2013

(51) Int. Cl.
| | | |
|---|---|---|
| C02F 1/14 | (2006.01) | |
| B01D 1/00 | (2006.01) | |
| B01D 3/02 | (2006.01) | |
| F24J 2/40 | (2006.01) | |
| F24J 2/38 | (2014.01) | |
| F24J 2/08 | (2006.01) | |

(52) U.S. Cl.
CPC .... *F24J 2/08* (2013.01); *F24J 2/40* (2013.01);
*F24J 2/38* (2013.01); *Y02E 10/47* (2013.01);
*B01D 3/02* (2013.01); *C02F 1/14* (2013.01);
*B01D 1/0035* (2013.01); *Y10S 203/11*
(2013.01); *Y10S 159/903* (2013.01)
USPC .................. 203/10; 203/12; 203/47; 203/48;
203/100; 202/164; 202/167; 202/172; 202/234;
202/261; 159/29; 159/45; 159/903; 126/600;
126/605; 126/698; 60/641.9

(58) Field of Classification Search
CPC .......... B01D 1/0035; B01D 3/02; C02F 1/14;
F25J 2/08; F25J 2/5417; F25J 2/38; F25J
2/40; Y02E 10/47
USPC ........... 202/164, 167, 172, 234, 261; 203/10,
203/47, 48, 100; 159/29, 45, 903; 126/600,
126/605, 698; 60/641.9
See application file for complete search history.

(56) References Cited

U.S. PATENT DOCUMENTS

| | | | | | |
|---|---|---|---|---|---|
| 2,920,710 | A | * | 1/1960 | Howard | 180/2.2 |
| 3,985,118 | A | * | 10/1976 | Bard | 126/575 |
| 4,075,063 | A | * | 2/1978 | Tsay et al. | 202/234 |
| 4,166,769 | A | * | 9/1979 | Dukess | 202/234 |
| 4,205,661 | A | * | 6/1980 | Chapman | 126/604 |
| 4,249,516 | A | * | 2/1981 | Stark | 126/601 |
| 4,279,704 | A | * | 7/1981 | Noble et al. | 202/175 |
| 4,323,052 | A | * | 4/1982 | Stark | 126/571 |
| 4,390,009 | A | * | 6/1983 | Consilvio | 126/604 |
| 6,696,637 | B2 | * | 2/2004 | Lawheed | 136/246 |
| 2012/0085635 | A1 | * | 4/2012 | Haynes | 203/11 |

* cited by examiner

*Primary Examiner* — Nina Bhat
*Assistant Examiner* — Jonathan Miller
(74) *Attorney, Agent, or Firm* — Lowe Hauptman & Ham, LLP

(57) ABSTRACT

Systems and methods for solar steam generation are described. The systems and methods include moving at least one frame mounted optical focusing lens to track the sun in two axes and disposing a water boiler at a focus of each optical focusing lens. Raw water is pumped through an inlet at a bottom of each boiler and solar energy is concentrated, using each optical focusing lens, on each boiler, heating the raw water in each boiler and evaporating steam from the raw water. The steam exits each boiler, via a steam outlet pipe. Remaining salts and solids in each boiler are ground by rotation of salt grinding-cleaning gears. These ground salts and solids are drained and/or pumped out of each boiler from an exit in the bottom of each boiler.

10 Claims, 9 Drawing Sheets

SOLAR STEAM GENERATION

BACKGROUND

Conventional water desalination and/or purification systems require considerable amounts of energy and/or equipment. Existing solar stills are generally inefficient. Such systems also typically produce concentrated brine discharges that can harm the environment. Most existing steam condensers allow cooling water to evaporate and low salinity water is continuously added to the system, which exhausts water resources. Similarly, existing systems and methods for generation of steam using concentrated solar energy generally employ complicated and expensive equipment that is typically prone to malfunction and/or requiring a high degree of maintenance. For example, most existing solar steam generators cannot tolerate saline and impure water.

SUMMARY

Systems and methods relating to solar steam generation are described. These systems and methods use at least one moveable, frame mounted optical focusing lens to track the sun in two axes and dispose a water boiler at a focus of each optical focusing lens. Raw water is pumped through an inlet at a bottom of each boiler and solar energy, concentrated using each optical focusing lens, is focused on each boiler, heating the raw water in each boiler and evaporating steam from the raw water. The steam exits each boiler, via a steam outlet pipe. Remaining salts and solids in each boiler are ground by rotation of salt grinding-cleaning gears. These ground salts and solids are drained and/or pumped out of each boiler from an exit in the bottom of each boiler.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

The systems and methods described herein relate to steam generation, such as may be used for desalination and distillation of water, namely to a solar steam generator, which can be used for gaining steam and distilled water out of impure water, using concentrated solar energy. Advantages of the present systems and methods include straightforwardness of design, easy maintenance, easy assembly and disassembly, and low cost. As noted, most existing solar steam generators cannot generally tolerate saline and impure water; also, they typically have low efficiency and high cost. Conversely, the present systems and methods produce steam and subsequently distilled water from impure and saline water in a generally straightforward and economical manner.

In accordance with various implementations of the present systems and methods, optical focusing lenses are moved together as a group to track the sun in two axes. In such implementations, the lenses may be rigidly connected and they may move together as one group, such as through the use of just two motors, one at the bottom of a frame mounting the lenses, to track the azimuth angle of the sun, and one on one side of the frame to move the rows of lenses together to track the elevation angle of the sun.

In accordance with such implementations, raw water is pumped to an inlet at the bottom of mini-water boilers, which are each located at a focus of one of the optical concentrating lenses. Therein, the water is heated and evaporates, whereupon steam leaves the mini-boiler, via a steam outlet pipe. Salts and solids that are left in the boiler may be cleaned, continuously, by rotation of salt grinding-cleaning gears. The ground salts and solids may then be pumped out of the mini-boilers under pressure, with some small amount of water, such as from an exit at the bottom of the respective mini-water boiler. Also, the rotational speed of the gears may stabilize the boiling of the raw water by limiting the formation of bubbles as well as limiting the crystallization of salts at the inner surfaces of the boiler.

Particular examples discussed herein are described generically, with reference to "distillation" of water. However, the present systems and methods are intended for use in any sort of purification of water including, but not limited to desalination, etc.

Also, specific examples discussed herein condense the generated steam to provide distilled water. However, the steam may be used as a heat source for other processes, such as power generation, heating, or the like. As a further alternative, the steam may be used as low-grade steam for use in further, or alternative, water distillation systems. For example, the steam may be used to heat raw water, which may result in cooling and condensing the steam, while aiding in distillation of this heated raw water.

An Exemplary Solar Steam Generator

Figure 1:
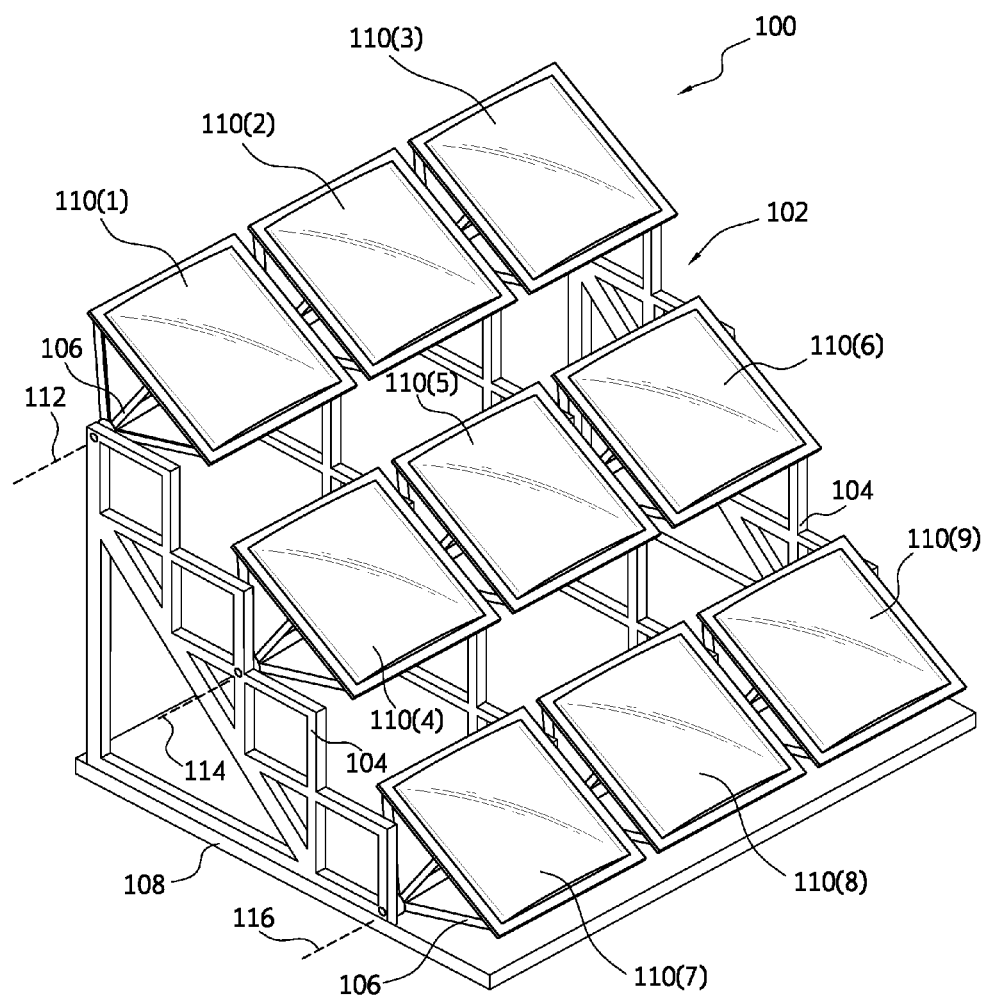
FIG. 1 is a perspective view of an example solar steam generation system, according to one embodiment.

FIG. 1 is a perspective view of example solar steam generation system 100, according to one embodiment. Solar steam generation system 100 comprises frame 102, which may be made up of a number of frame trusses 104 and/or a number of other support components 106, such as struts, braces and/or the like, which may, in turn be mounted on base 108. One or more optical focusing lenses 110(1-9) are operatively mounted on frame 102. Lenses 110(1-9) are movable in two axes to track the sun.

For example, lenses 110(1-9) may pivot about a vertical axis, as a unit, to track an azimuth angle of the sun. To such end, base 108 may rotate about a vertical axis, as discussed below, to move frame 102, and hence lenses 110(1-9) to track an azimuth angle of the sun.

As a further example, a row of lenses, such as lenses 110(1-3), 110(4-6) and/or 110(7-9), may rotate about a horizontal axis of that row, 112, 114 or 116, respectively, to track an elevation angle of the sun.

Figure 2:
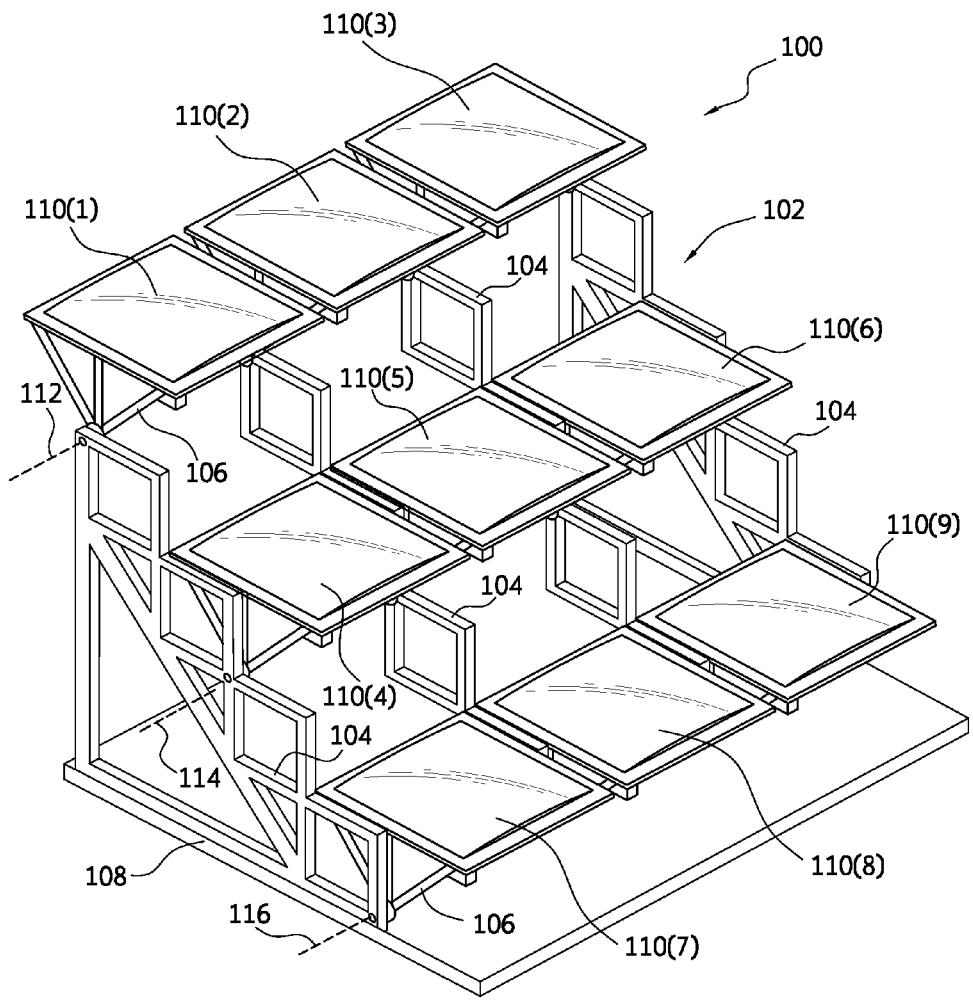
FIG. 2 is a perspective view of the example solar steam generation system of FIG. 1, showing the lenses rotated to a moved position, such as to follow the elevation of the sun, according to one embodiment.

FIG. 2 is a perspective view of example solar steam generation system 100 of FIG. 1, showing lenses 110 (1-9) rotated to a moved position, such as to follow the elevation of the sun, according to one embodiment. In FIG. 2, the lenses are shown disposed at about a ninety-degree angle, such as for capturing light from the sun when the sun is directly overhead. Rows of lenses 110(1-3), 110 (4-6) and/or 110(7-9) may rotate about their vertical axes separately. Rather, in accordance with various implementations, these rows of lenses rotate about their vertical axis in concert, as shown between FIGS. 1 and 2, to track the elevation of the sun.

Figure 3:
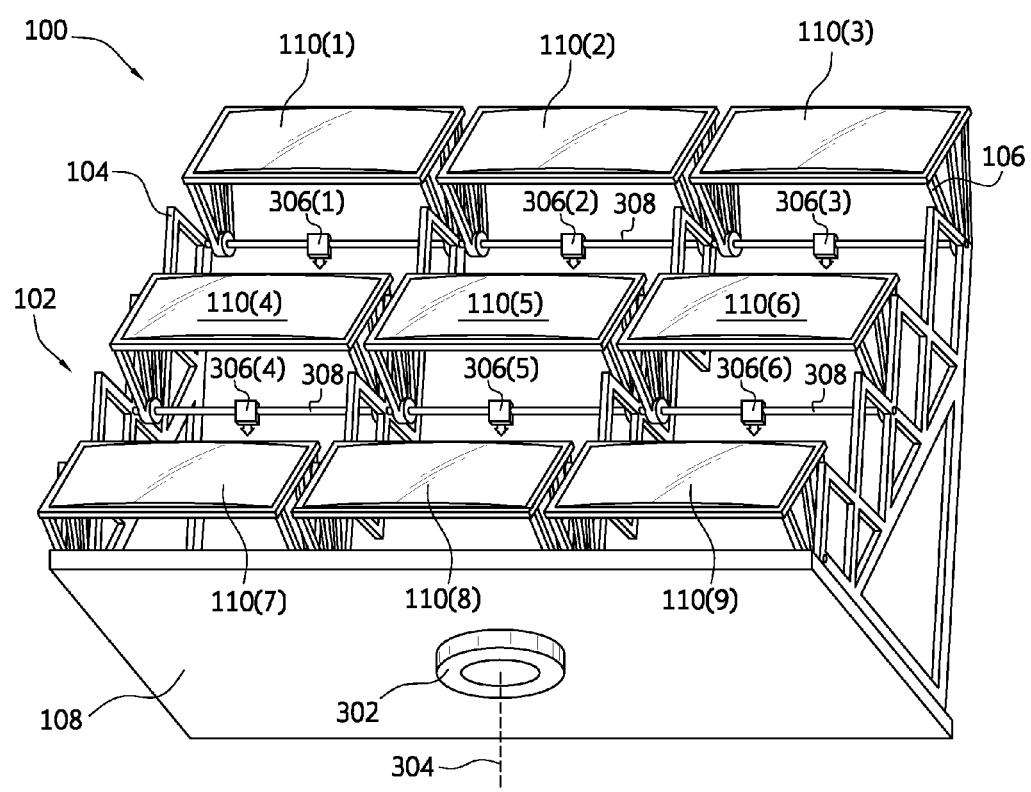
FIG. 3 is an alternative perspective view of the example solar steam generation system of FIG. 1, according to one embodiment.

FIG. 3 is an alternative perspective view of example solar steam generation system 100 of FIG. 1, according to one embodiment. Therein, frame 102, mounted on base 108, is shown from a bottom perspective, so as to better show base rotation center hub 302.

Figure 4A:
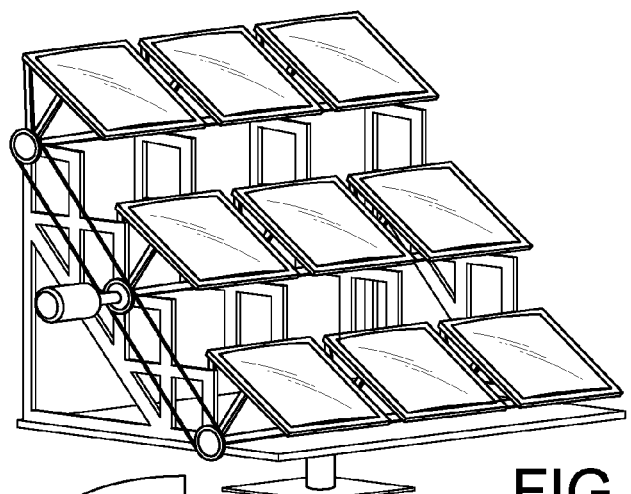
FIGS. 4*a* and 4*b* show exemplary implementations of lens movement to track the sun in a single horizontal axis, according to one embodiment.
Figure 4B:
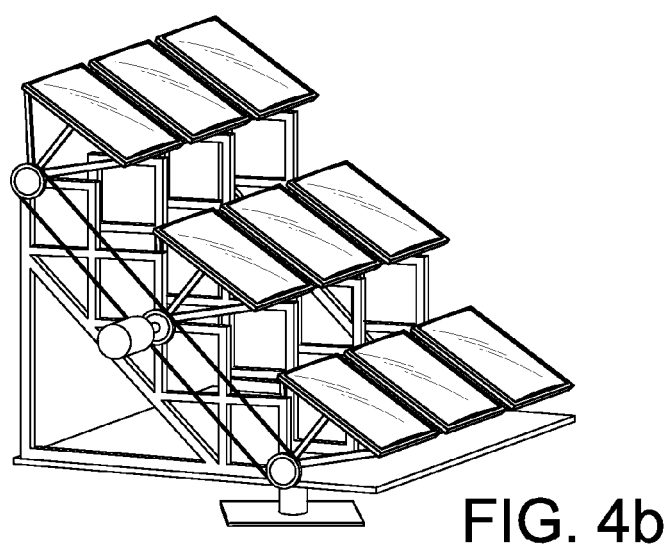

FIGS. 4a, 4b, 5a and 5b show exemplary implementations of lens movement to track the sun in two axes, according to one embodiment. In accordance with various embodiments one or more motors may be used to provide the above-discussed movement of lenses 110 (1-9) in two axes to track the sun. Referring to FIGS. 4a and 4b, for example, a first motor may be operatively connected to base 108, particularly base rotation center hub 302 to rotate base 108 so as to move lenses 110(1-9), as a unit, about vertical axis 304 to track the azimuth angle of the sun. Thus, this first motor may be deployed under or upon base 108, at a bottom of frame 102.

Figure 5A:
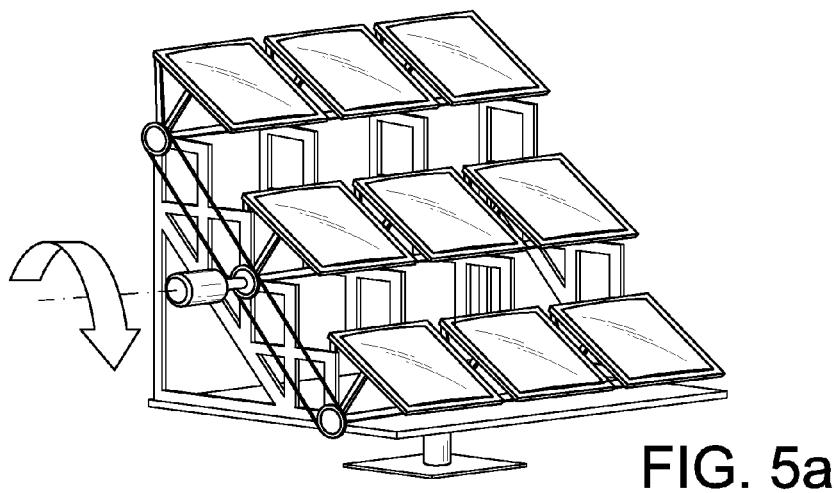
FIGS. 5*a* and 5*b* show exemplary implementations of lens movement to track the sun.
Figure 5B:
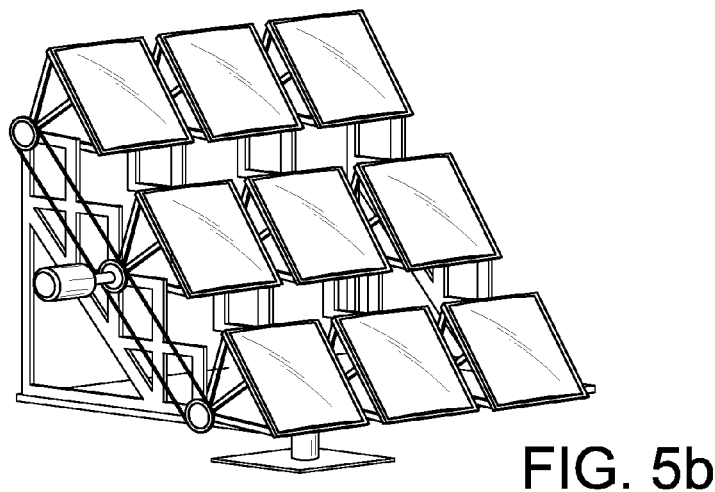

Referring to FIG. 1, and as noted, horizontal rows 110(1-3), 110(4-6) and 110(7-9) of optical focusing lenses are operatively mounted on frame 102. Referring to FIGS. 5a and 5b, these horizontal rows of lenses may be operatively coupled to a second motor to rotate the rows of optical focusing lenses, separately, together, or otherwise in concert, about axes 112, 114 and 116, to track the elevation angle of the sun. Correspondingly this second motor may be deployed to one side of frame 102, such as outside or immediately inside one of frame trusses 104.

Referring to FIG. 3, some of the plurality of mini (i.e. small) water boilers 306(1-9), which will be discussed in greater detail below. As may be best seen in FIG. 3, at least with respect to mini boilers 306(1-6), each mini water boiler 306(1-9) is disposed at a focus of a corresponding one of optical focusing lens 110(1-9). Some of mini water boiler salt grinding-cleaning gear driveshafts 308 can also be seen in FIG. 3.

Figure 6:
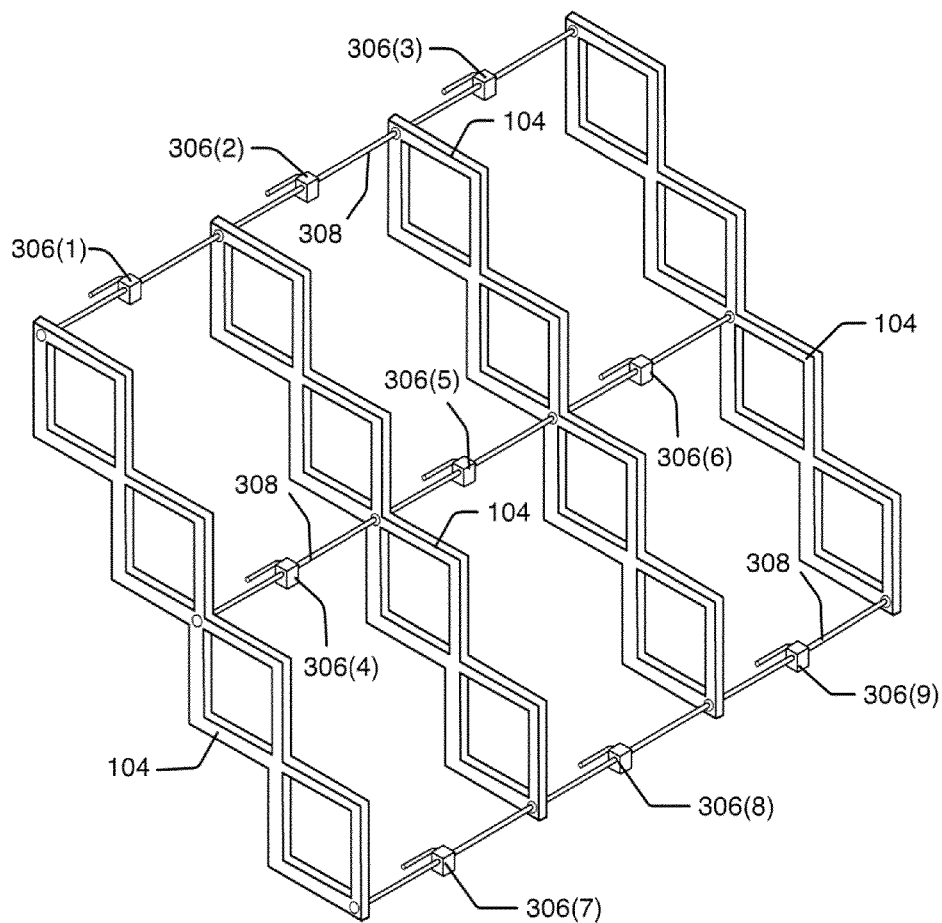
FIG. 6 is a partially fragmented perspective view of the frame trusses, boilers and drive shafts of the example solar steam generation system of FIG. 1, according to one embodiment.

FIG. 6 is a partially fragmented perspective view of frame trusses 104, all of mini boilers 306(1-9) and all of driveshafts 308 of example solar steam generation system 100 of FIG. 1, according to one embodiment.

Figure 7:
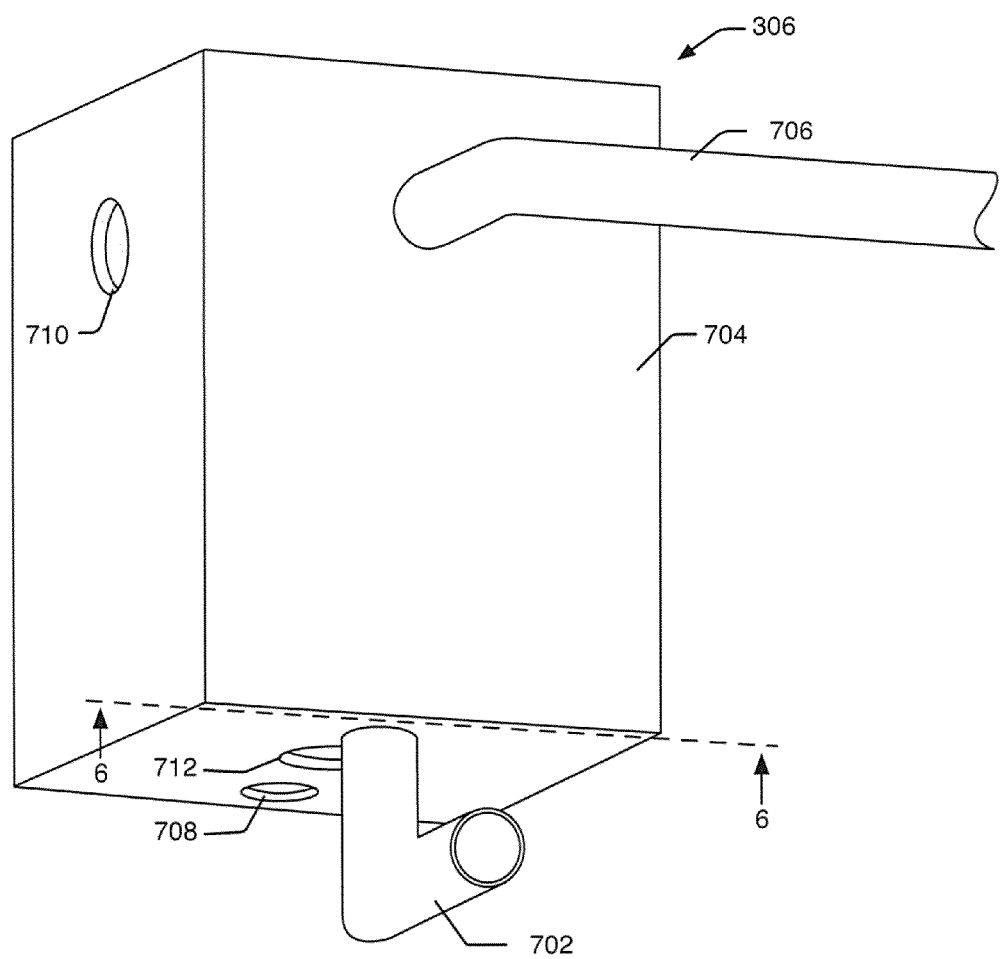
FIG. 7 is an enlarged perspective view of a boiler of the example solar steam generation system of FIG. 1, according to one embodiment.

FIG. 7 is an enlarged perspective view of one of mini boilers 306 of example solar steam generation system 100 of FIG. 1, according to one embodiment. Each mini water boiler 306 comprises raw water inlet pipe 702, disposed at a bottom of housing 704 of water boiler 306, through which raw water to be distilled may be pumped into housing 704. Therein, the raw water is heated and evaporates, whereupon steam leaves mini-boiler 306, via steam outlet pipe 706. Steam outlet pipe 706 is disposed near a top of housing 704. This steam may be condensed to distill water. Additionally or alternatively, the steam may be used as a heat source for other processes, such as power generation, heating, etc. The steam may alternatively be used as low-grade steam for use in further, or alternative, water distillation systems, such as to heat raw water, which may result in cooling and condensing the steam, while aiding in distillation of this other heated raw water.

Precipitated salts and solids may exit housing 704 via salts and solids exit 708, also disposed at the bottom of housing 704 of mini water boiler 306. Driveshaft opening 710 operatively receives driveshaft 308 discussed above and below, while opening 712 accommodates an idler shaft of a lower, pinion salt grinding-cleaning gear, also discussed below.

Figure 8:
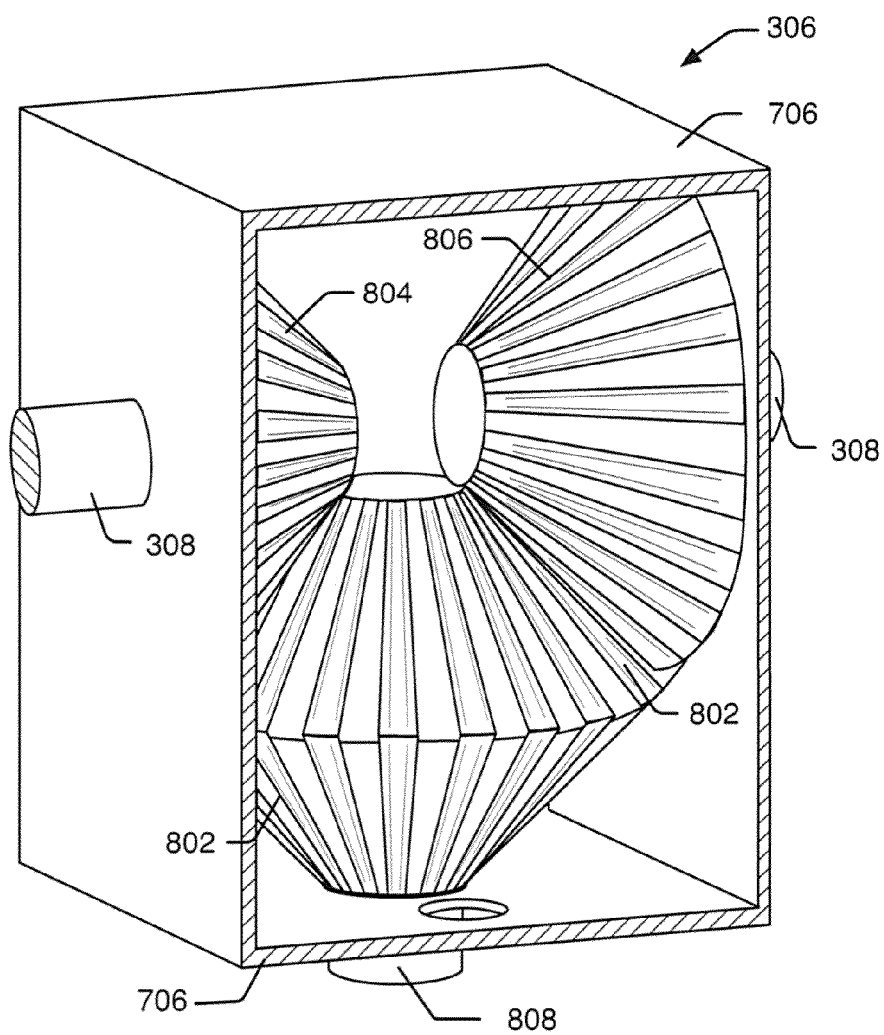
FIG. 8 is a generally cross-sectional fragmented perspective diagrammatic view, taken generally along line 6-6 of FIG. 7, showing disposition of internal components of an example boiler, according to one embodiment.

FIG. 8 is a generally cross-sectional fragmented perspective diagrammatic view, taken generally along line 6-6 of FIG. 7, showing disposition of internal components of example boiler 306, according to one embodiment. As can be seen in FIG. 7, salt grinding-cleaning gears 802, 804 and 806 may be disposed in each mini water boiler 306. Salts and solids that are left in the boiler due to evaporation of distilled steam from the raw water in the housing may be cleaned, possibly continuously, by rotation of salt grinding-cleaning gears 802, 804 and 806. Lower, pinion salt grinding-cleaning gear 802 may be mounted on idler shaft 808, though housing opening 712, discussed above, with respect to FIG. 7. One of upper salt grinding-cleaning gears 804 or 806 may be driven by one of drive shafts 308, which in-turn drives lower, pinion salt grinding-cleaning gear 802, thereby driving the other one of upper salt grinding-cleaning 804 or 806 and hence its connected driveshaft. As a result, the salt grinding-cleaning gears of each horizontal row of boilers 306(1-3), 306(4-6) or 306(7-9) (See FIGS. 3 and 6) are "ganged" together and driven from a single source, such as a third motor, coupled to any one of driveshafts 308 in each of the horizontal rows of boilers 306(1-3), 306(4-6) and 306(7-9). The rotational speed of gears 802, 804 and 806 may assist in stabilizing boiling of the raw water by limiting the formation of bubbles, as well as limiting the crystallization of salts at the inner surfaces of the boiler.

As noted above, precipitated salts and solids, such as may be ground and/or cleaned from within interior of housing 704 by salt grinding-cleaning gears 802, 804 and 806, may exit housing 704 via salts and solids exit 708 (see FIG. 7), disposed at the bottom of housing 704 of mini water boiler 306. In accordance with various embodiments these ground salts and solids may be pumped out of the mini-boilers, under pressure, with some small amount of water. Also seen in FIG. 8 is inlet opening 810, through which raw water inlet pipe 702 (see FIG. 7) admits water into housing 704.

An Exemplary Water Distillation Procedure

Figure 9:
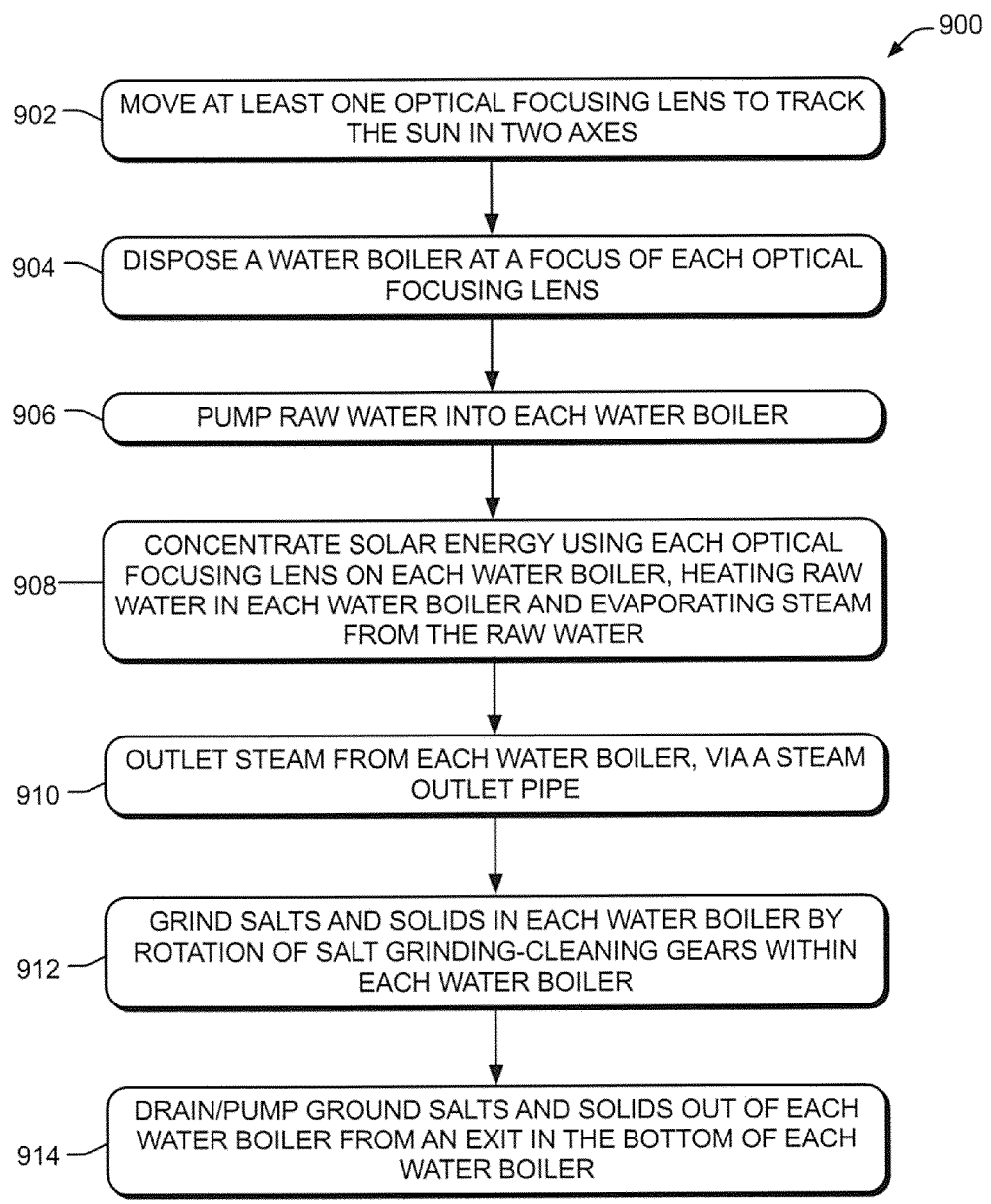
FIG. 9 shows an example procedure for solar steam generation, according to one embodiment.

FIG. 9 shows example procedure 900 for solar steam generation, according to one embodiment, such as may be carried out employing solar steam generation system 100, described above. At 902, procedure 900 for solar steam generation calls for moving at least one optical focusing lens to track the sun in two axes. This movement of the optical focusing lens(es) to track the sun further might entail rotating the optical focusing lens(es) about a vertical axis to track an azimuth angle of the sun and/or rotating the optical focusing lens(es) about a horizontal axis to track the elevation angle of the sun.

At 904, a mini water boiler is disposed at a focus of each optical focusing lens and raw water is pumped through an inlet at a bottom of each mini water boiler at 906. Solar energy is concentrated on each mini water boiler using each optical focusing lens at 908, heating raw water in each mini water boiler and evaporating (distilled) steam from the raw water. At 910, this steam may be outlet from each mini water boiler, via a steam outlet pipe, such as for condensing into distilled water, and/or for use as a heat source.

Salts and/or solids may be ground in each mini water boiler at 912, by rotation of salt grinding-cleaning gears within each mini water boiler. This rotation of the salt grinding-cleaning gears may be continuous. Boiling of the raw water at 908 may be stabilized by employing a rotational speed of the gears selected to limit formation of bubbles in the raw water in the housing of the mini water boiler. Meanwhile, at 914, ground salts and solids are drained and/or pumped out of each mini water boiler from an exit in the bottom of each mini water boiler. Such pumping may be carried out under some degree of pressure, wherein some small amount of raw water is pumped out with the ground salts and solids.

CONCLUSION

Although systems and methods for solar steam generation have been described in language specific to structural features and/or methodological operations or actions, it is understood that the implementations defined in the appended claims are not necessarily limited to the specific features or actions described. Rather, the specific features and operations of solar steam generation are disclosed as exemplary forms of implementing the claimed subject matter.

The invention claimed is:

1. A solar steam generation method comprising:
   moving at least one optical focusing lens to track the sun in two axes;
   disposing a water boiler at a focus of each optical focusing lens;
   pumping raw water through an inlet at a bottom of each water boiler;
   concentrating solar energy using each optical focusing lens on each water boiler, heating raw water in each water boiler and evaporating steam from the raw water;
   outletting the steam from each water boiler, via a steam outlet pipe;
   continuously grinding salts and solids in each water boiler by rotation of salt grinding-cleaning gears within each water boiler; and
   draining ground salts and solids out of each water boiler from an exit in the bottom of each water boiler.

2. The solar steam generation method of claim 1, further comprising:
   stabilizing boiling of the raw water by employing a rotational speed of the gears selected to limit formation of bubbles in the raw water and limiting the crystallization of salts at the inner surfaces of the boilers.

3. The solar steam generation method of claim 1 wherein the draining comprises pumping ground salts and solids out of each water boiler from the exit in the bottom of each water boiler.

4. The solar steam generation method of claim 1 wherein the draining comprises pumping ground salts and solids out of each water boiler from the exit in the bottom of each water boiler under some pressure where some small amount of raw water is pumped out with the ground salts and solids.

5. The solar steam generation method of claim 1 wherein moving the at least one optical focusing lens to track the sun further comprises:
   rotating the at least one optical focusing lens about a vertical axis to track an azimuth angle of the sun.

6. The solar steam generation method of claim 1 wherein moving the at least one optical focusing lens to track the sun further comprises:
   rotating the at least one optical focusing lens about a horizontal axis to track the elevation angle of the sun.

7. A solar steam generation system comprising:
   a frame;
   a plurality of optical focusing lenses operatively mounted on the frame to move together as a group to track an azimuth angle of the sun and an elevation angle of the sun;
   a plurality of mini water boilers, each of the water boilers disposed at a focus of one optical focusing lens of the plurality of optical focusing lenses, each water boiler comprising:
      a raw water inlet disposed at a bottom of each mini water boiler;
      a steam outlet pipe disposed at a top of each mini water boiler;
      salt grinding-cleaning gears for continuously cleaning said boilers by rotation of said salt grinding gears and wherein the rotational speed of the gears stabilize the boiling of the raw water by limiting the formation of bubbles as well as limiting the crystallization of salts at the inner surfaces of the boiler; and
      salts and solids exit disposed at the bottom of each water boiler; and
   said system further comprising:
   a first motor disposed at a bottom of said frame and operatively disposed with the frame to move the lenses together as a group to track the azimuth angle of the sun;
   a second motor operatively disposed with said frame to move the lenses together to track the elevation angle of the sun; and
   wherein the second motor is disposed on a side of the frame.

8. The solar steam generation system of claim 7 wherein the frame, and thus the plurality of optical focusing lenses operatively mounted on the frame, pivots to track the azimuth angle of the sun.

9. The solar steam generation system of claim 7 wherein the frame is mounted on a base and the first motor is operatively connected to the base and rotates the base so as to move the lenses as a unit to track an azimuth angle of the sun.

10. The solar steam generation system of claim 7, further comprising:
    a plurality of driveshafts, driven by a third motor, each driveshaft extending through a plurality of water boilers and operatively coupled to the salt grinding-cleaning gears disposed in each of these water boilers.

* * * * *